United States Patent
Kanbegawa

(10) Patent No.: US 6,246,795 B1
(45) Date of Patent: *Jun. 12, 2001

(54) IMAGE PROCESSING APPARATUS AND METHOD

(75) Inventor: Minoru Kanbegawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,793

(22) Filed: Dec. 24, 1997

(30) Foreign Application Priority Data

Dec. 27, 1996 (JP) .................................... 8-350382

(51) Int. Cl.$^7$ ................................ G06K 9/36; G06K 9/46
(52) U.S. Cl. ...................... 382/232; 358/448; 358/452; 358/426; 358/443; 382/234
(58) Field of Search .................................... 382/232, 234, 382/235; 358/426, 433, 443, 448, 450, 452

(56) References Cited

U.S. PATENT DOCUMENTS

| | | | |
|---|---|---|---|
| 5,436,732 | * | 7/1995 | Mikami ................................ 358/443 |
| 5,638,464 | * | 6/1997 | Kawamura ............................ 382/232 |
| 5,774,592 | * | 6/1998 | Takeuchi et al. ..................... 382/234 |
| 5,808,752 | * | 9/1998 | Naba ..................................... 358/426 |

* cited by examiner

Primary Examiner—Thomas D. Lee
(74) Attorney, Agent, or Firm—Fitzpatrick, Cella, Harper & Scinto

(57) ABSTRACT

This invention is to generate image data at a high speed in units of bands on the basis of input data while effectively utilizing limited resources. Each of compression/expansion circuits (201, 202) independently operates in a compression or expansion mode in accordance with a signal set in a register (205). When bitmap image data stored in a RAM (19) is to be simply compressed, a switch (206) is connected to a terminal (B) such that the compression/expansion circuits (201, 202) are substantially connected in parallel to efficiently perform compression. When compressed data must be edited, the compression/expansion circuit (201) is set in the expansion mode, and the compression/expansion circuit (202) is set in the compression mode. The switch (206) is connected to a terminal A such that the compression/expansion circuits (201, 202) are connected in series. Expanded image data output from the compression/expansion circuit (201) is logically synthesized with desired image data by a logic calculation block (204), and the synthesis result is compressed by the compression/expansion circuit (202) again.

12 Claims, 6 Drawing Sheets

IMAGE PROCESSING APPARATUS AND METHOD

BACKGROUND OF THE INVENTION

1. Field of the Invention

The present invention relates to an image processing apparatus and a control method therefor and, more particularly, to an image processing apparatus which interprets received print data and generates image data and a control method therefor.

2. Description of the Related Art

A laser beam printer as the most popular page printer generally comprises a printer engine unit (the printer engine unit is constituted by a photosensitive drum, a laser light-emitting device, a developing unit, and the like) for actually performing printing, and a printer controller for receiving print data, generating bitmap data, and outputting the bitmap data to the printer engine unit.

The printer controller interprets received print data and generates intermediate data (intermediate code) to quickly develop data into bitmap data. A bitmap image is developed in accordance with the generated intermediate code and output to the printer engine unit.

Along with a steady increase in resolutions of the printer engine units of recent page printers, the print quality is becoming high.

However, as the resolution becomes high, the memory capacity required for developing a bitmap image of one page enormously increases.

Some printers divide image data of one page into a plurality of bands, develop image data in units of bands instead of developing the bitmap image of one page, and output the image data to the printer engine unit. Such a page printer for printing an image in units of bands allows printing with a small memory capacity because it needs no memory for high-resolution data of one page, so the cost can be reduced.

A problem of this printer is that once the printer engine unit starts to operate, the operation cannot be stopped until formation of an image of one page is complete. More specifically, if the time for outputting a certain band to the printer engine unit comes before development of bitmap image data based on intermediate data is complete, no normal print result can be obtained anymore.

Such a situation often occurs not in printing a normal document but in printing a complex image, i.e., an image having a lot of line segments to be drawn.

In print data (data described in a page description language) received from a computer, generally, the described commands are arranged from the upper side to the lower side of a page. However, this does not always apply. Unless print data of one page has been completely received (unless a page feed command or the like is received), printing cannot be started. That is, printing cannot be started until intermediate data for print data of one page is generated. However, when the amount of intermediate data increases (when the image to be printed is complex), the memory area used to develop a band image may not be ensured.

SUMMARY OF THE INVENTION

The present invention has been made in consideration of the above problems, and has as its object to provide an image processing apparatus which realizes high-speed printing using a small memory capacity while outputting bitmap image data in time in printing the image in units of bands, and a control method therefor. In order to achieve the above object, according to the present invention, there is provided an image processing apparatus which generates an image in units of bands on the basis of input data and outputs the image, comprising: at least two compression/expansion means for compressing image data or expanding compressed data; designation means for designating a compression mode or an expansion mode for each of said compression/expansion means; setting means for dynamically connecting said compression/expansion means in parallel or in series; logical operation means, substantially arranged at an intermediate position between said compression/expansion means connected in series by said setting means, for logically synthesizing data from an upstream compression/expansion means with desired data and supplying the synthesized data to a downstream compression/expansion means; and control means for controlling said designation means, said setting means, and said logical operation means such that when the image data is to be simply compressed/expanded, said setting means connects said compression/expansion means in parallel, and said compression/expansion means parallelly compress/expand the image data, and when image data which has temporarily been compressed is to be edited, said setting means connects said compression/expansion means in series, said upstream compression/expansion means is set in an expansion mode and said downstream compression/expansion means is set in a compression mode, and said logical operation means logically synthesizes the image data to generate compressed image data.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment of the present invention will be described below in detail with reference to the accompanying drawings.

Figure 2:
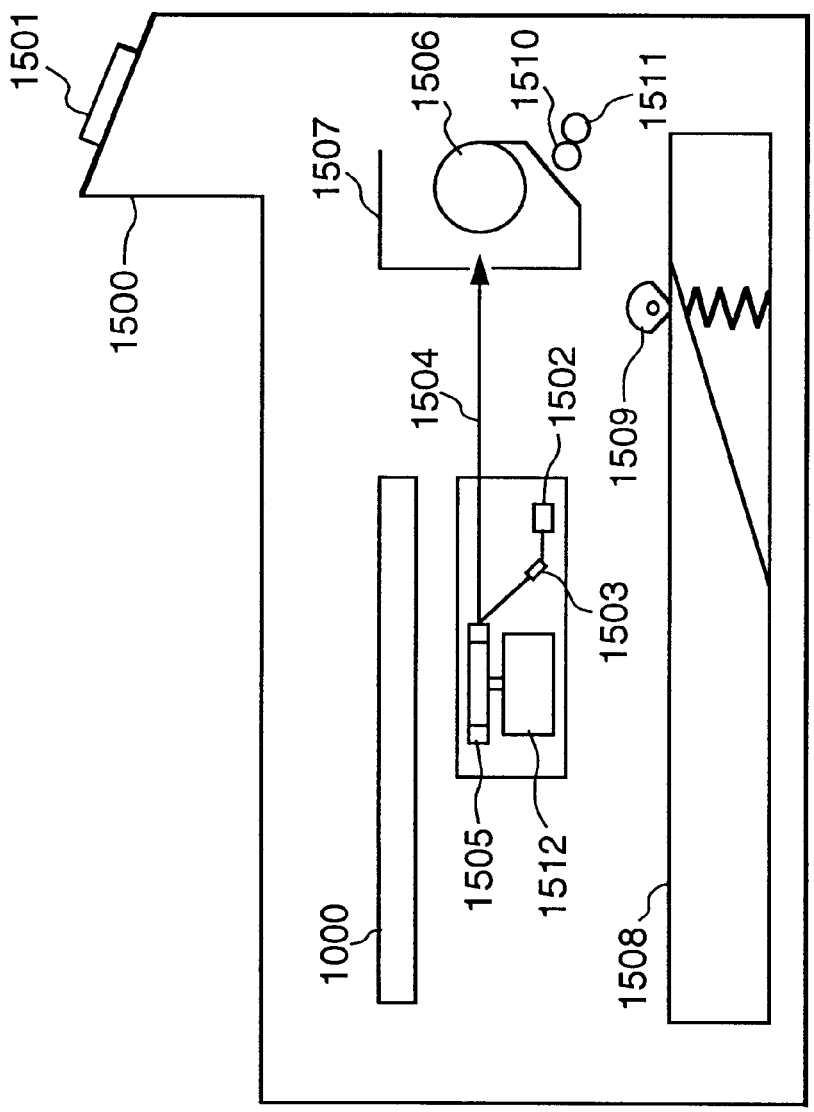
FIG. 2 is a sectional view of the printing apparatus of the embodiment.

FIG. 2 is a sectional view showing the arrangement of a page printer to which the present invention can be applied. This printer is a laser beam printer (LBP).

Referring to FIG. 2, reference numeral 1500 denotes an LBP main body which receives page description data supplied from an external host computer and stores the data. The LBP main body 1500 also prepares a corresponding character pattern or form pattern in accordance with the stored data and forms an image on a recording paper sheet, i.e., a recording medium. Reference numeral 1501 denotes an operation panel having a selector for selecting an operation, an LED display device, and the like. Reference numeral 1000 denotes a printer controller which controls the entire LBP main body 1500 and also converts data mainly sent from the host computer into a corresponding video signal and outputs the video signal to a laser driver 1502.

The laser driver 1502 is a circuit for driving a semiconductor laser 1503. The laser driver 1502 ON/OFF-controls a laser beam 1504 emitted from the semiconductor laser 1503 in accordance with the received video signal. The laser beam 1504 is deflected in the right-and-left direction by a rotary polygon mirror 1505 and scans/exposes an electrostatic drum 1506. With this operation, an electrostatic latent image of, e.g., a character pattern is formed on the electrostatic drum 1506. This latent image is developed by a developing unit 1507 disposed around the electrostatic drum 1506, transferred to a recording paper sheet, and fixed by a fixing unit (not shown). Thereafter, the paper sheet is discharged. Cut sheets are used as recording paper sheets. The cut sheets are stored in a paper cassette 1508 loaded in the LBP 1500, supplied into the apparatus by a feed roller 1509 and convey rollers 1510 and 1511, and then supplied to the electrostatic drum 1506.

Figure 1:
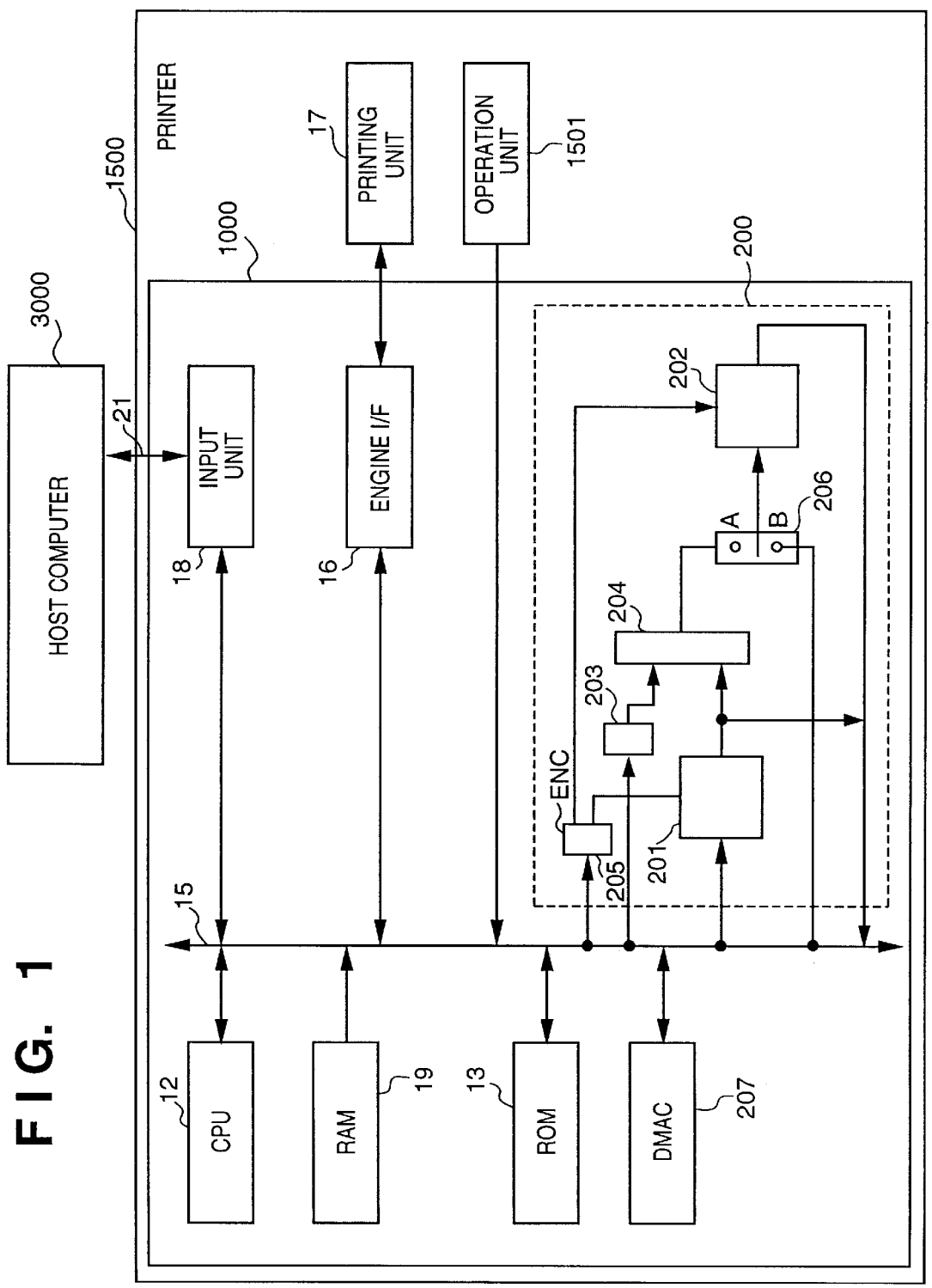
FIG. 1 is a block diagram of a printer controller in a printing apparatus according to an embodiment.

FIG. 1 is a block diagram of the printer controller 1000 of this embodiment. A laser beam printer (FIG. 2) will be exemplified herein. As far as the function of this embodiment is implemented, the present invention can be applied to a system constituted by a plurality of devices, or a system for performing processing through a network such as a LAN, as a matter of course. The printer is not limited to a laser beam printer, and a page printer of another type (e.g., an LED printer) may also be used.

Referring to FIG. 1, reference numeral 3000 denotes a host computer comprising a CPU, a RAM, a hard disk (HD), a keyboard, a CRT display, an interface controller for controlling communication with the printer, and the like.

In the printer controller 1000, a printer CPU 12 systematically controls access to various devices connected to a system bus 15 on the basis of a control program stored in a program ROM 13, and also outputs an image signal as output information to a printing unit (printer engine) 17 connected via a printing unit interface 16. The program ROM 13 also stores a control program for the CPU 12 as shown in the flow chart of FIG. 4 and font data used in generating output information.

The CPU 12 can perform bidirectional communication with the host computer through an input unit 18, so information in the printer can be supplied to the host computer 3000. A RAM 19 functions as a main memory or work area for the CPU 12 and is used as a reception buffer, a bitmap data development area, or an environment data storage area. To reduce the cost of components of the product, the capacity of the RAM 19 is so small that bitmap data of one page cannot be stored.

A compression/expansion unit 200 as the characteristic feature of this embodiment is connected to the system bus 15. Compression/expansion circuits 201 and 202 perform compression or expansion. A register 205 whose bits can be set by the CPU 12 independently designates the operation modes (coding and decoding modes) of the compression/expansion circuits 201 and 202. Reference numeral 203 denotes a FIFO memory; and 204, a logical operation unit for performing logical calculation, e.g., ORing two bitmap data output from the FIFO memory 203 and the compression/expansion circuit 201. The FIFO memory 203 is operated as a first-in first-out memory circuit for setting synchronization in position between an image and bitmap data output from the compression/expansion circuit 201. A switch 206 is switched in accordance with a control signal from the CPU 12 to select, as an input to the compression/expansion circuit 202, a signal from the logical operation unit 204 or a signal from the bus 15. A DMAC 207 controls transmission/reception of image data between the compression/expansion unit 200 and the RAM 19 or the like.

Figure 6:
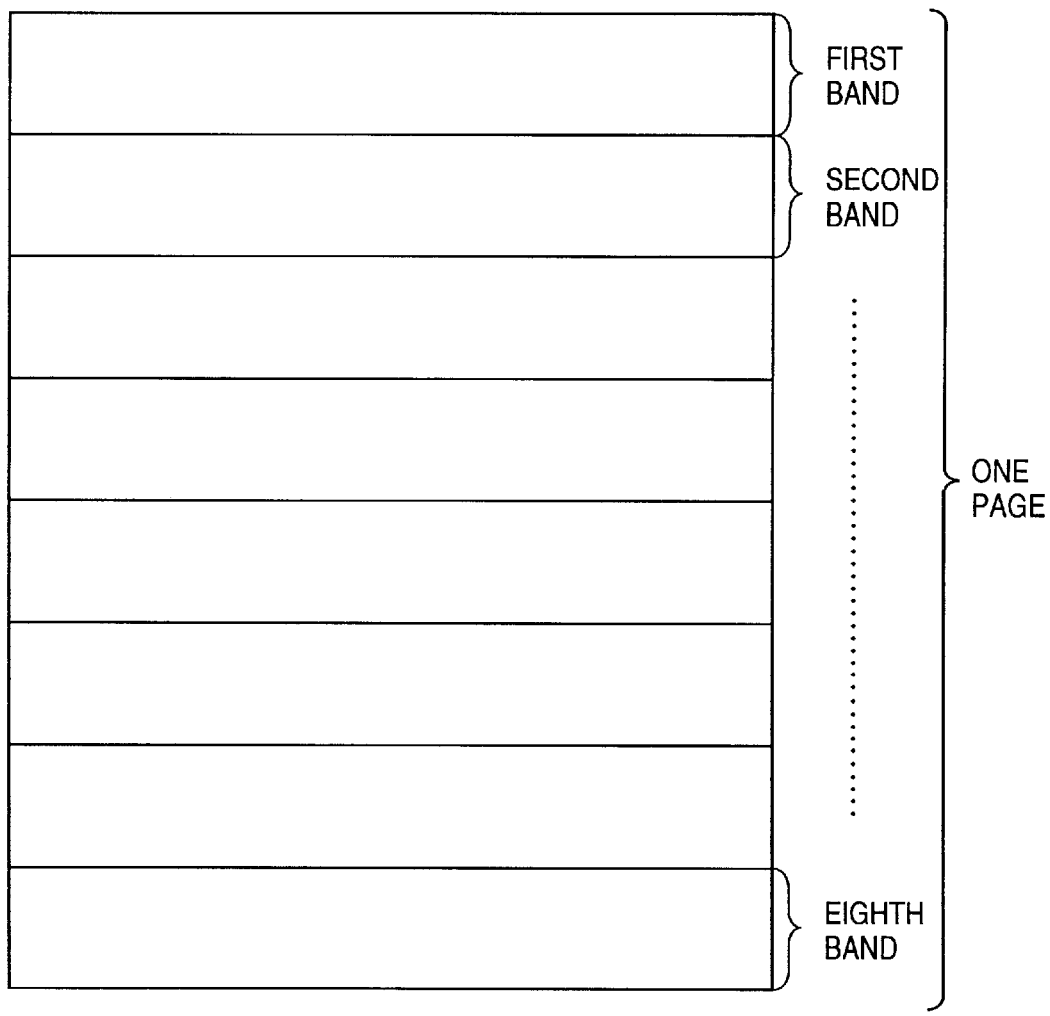
FIG. 6 is a view showing a page having a plurality of bands.

In the printer of this embodiment, an image to be printed on, e.g., an A4 recording paper sheet is divided into eight bands, as shown in FIG. 6, and processed in units of bands. However, the number of bands is not limited to eight, as a matter of course.

Figure 5:
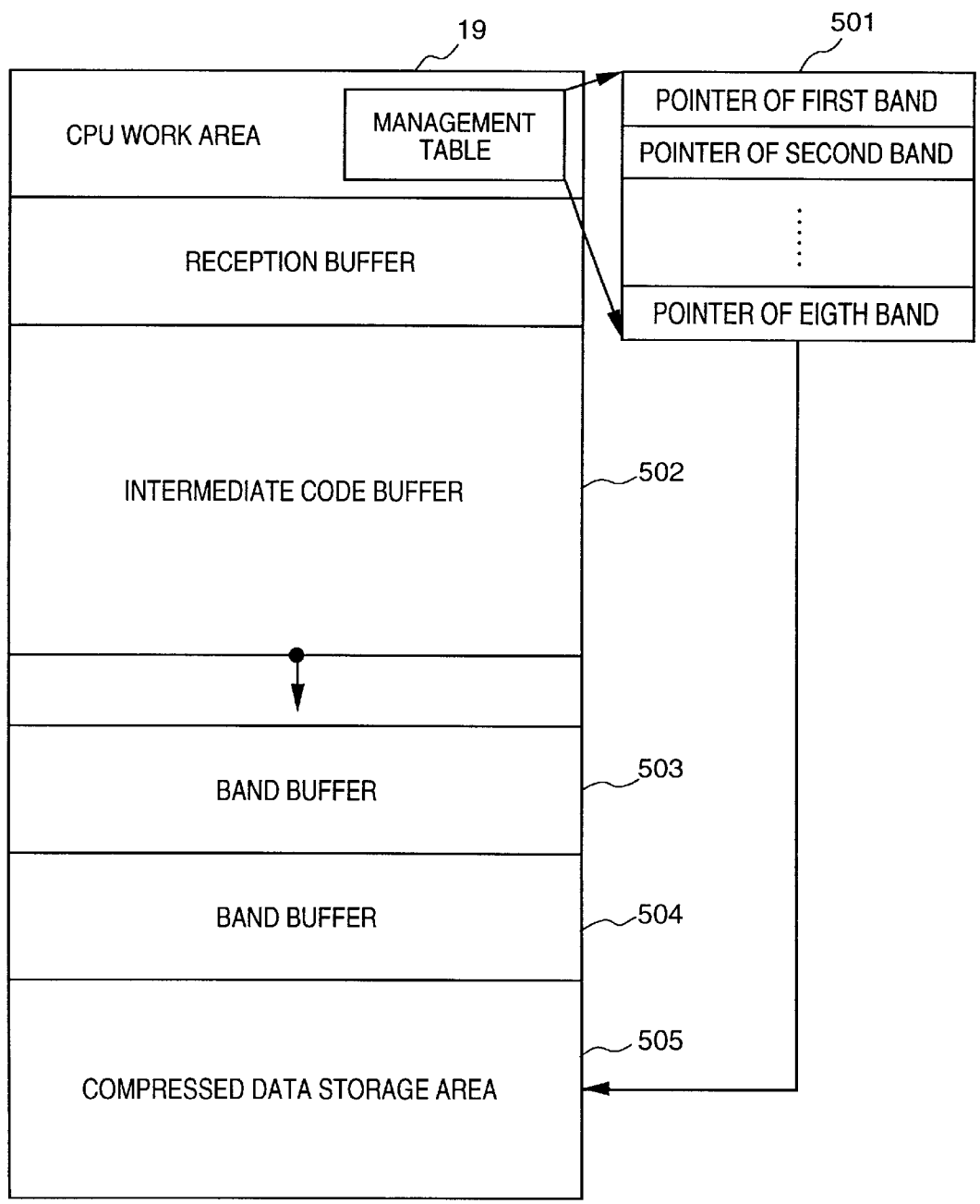
FIG. 5 is a view showing the memory map of a RAM of the embodiment.

FIG. 5 shows the memory map of the RAM 19 of this embodiment.

As shown in FIG. 5, the RAM 19 has an area used as a work area for the CPU 12, a reception buffer area, an intermediate code buffer 502 for storing intermediate code data generated on the basis of received print data, band buffers 503 and 504 for developing two band images, and a compressed data storage area 505. The work area has a management table 501 storing storage destination addresses (pointers) of compressed data of the respective bands. The size of the intermediate code buffer in the RAM 19 is indefinite.

The schematic arrangement of this embodiment will be described below.

When print data described in a page description language is received from the host computer 3000, the received data is stored in the reception buffer. The data (command) stored in the reception buffer is sequentially read out, converted into intermediate code data which can be drawn at a high speed, and stored in the intermediate code buffer 502. When generation of intermediate code of one page is complete, image development (image drawing) is performed in the band buffers 503 and 504 in units of bands in accordance with the intermediate code data stored in the intermediate code buffer. The CPU 12 issues a paper feed instruction to the printing unit 17 and outputs the image data developed in the band buffer to the printing unit 17 through the engine interface 16 at a predetermined timing. Initially, image data development is performed in the two band buffers 503 and 504. While image data developed in one band buffer is being output to the printing unit 17, image development is performed in the other band buffer. The image of one page is printed by repeating this processing.

If the image of one page to be printed is complex, and it is determined that the amount of generated intermediate code data becomes so large that image development may be impeded (if the difference between the storage address and the start address of the band buffer is equal to or smaller than a predetermined value), the band image is developed in accordance with intermediate code data which has been generated halfway through one page.

At this time, the CPU 12 sets a signal in the register 205 such that both the compression/expansion circuits 201 and 202 function in a compression mode. Since the two band buffers are ensured, as shown in FIG. 5, the CPU 12 develops two band images. Upon completing development of two band images, the image data stored in the band buffers are parallelly compressed by the compression/expansion circuits 201 and 202 and stored in the compressed data storage area 505.

More specifically, the CPU 12 connects the switch 206 to a terminal B such that the compression/expansion circuits 201 and 202 are substantially connected in parallel. The CPU 12 sets the DMAC 207 to transfer the image data in the band buffer 503 to the compression/expansion circuit 201, and the image data in the band buffer 504 to the compression/expansion circuit 202. Compressed data output from the compression/expansion circuits 201 and 202 are stored in the compressed data storage area 505.

An area of the intermediate code buffer 502 where a used intermediate code has been stored is used to store a new intermediate code.

As described above, when commands described in the page description language, which are contained in the print data, are arranged from the upper side to the lower side of a page, each band image is compressed and stored in the above manner. In printing, the image data may be expanded in units of bands, alternately stored in the band buffers 503 and 504, and output to the printing unit 17.

However, the presence of an intermediate code which should be drawn in the first band is sometimes detected after, e.g., the eighth band image has been developed, compressed and stored in the compressed data storage area 505.

In this case, the CPU 12 develops, in the band buffer 503, image data based on the unprocessed intermediate code, i.e., the image which is supposed to be developed in the first band. The CPU 12 connects the switch 206 to a terminal A. As a result, the compression/expansion circuits 201 and 202 are connected in series. The CPU 12 sets a signal in the register 205 such that the compression/expansion circuit 201 functions in the expansion mode, and the compression/expansion circuit 202 functions in the compression mode. Image data corresponding to the new intermediate code developed in the band buffer 503 is output to the FIFO memory 203, and simultaneously, the compressed data of the first band is output to the compression/expansion circuit 201 and expanded. The image data expanded and output from the compression/expansion circuit 201 is synthesized (e.g., ORed in units of bits) with the image data stored in the FIFO memory 203 by the logical operation unit 204 and output to the compression/expansion circuit 202. Since the compression/expansion circuit 202 is set in the compression mode, the synthesis result is compressed and stored in the compressed data storage area again.

Since the two compression/expansion circuits 201 and 202 are connected in parallel or in series, compression/expansion can be efficiently performed using a small number of circuits.

Figure 3:
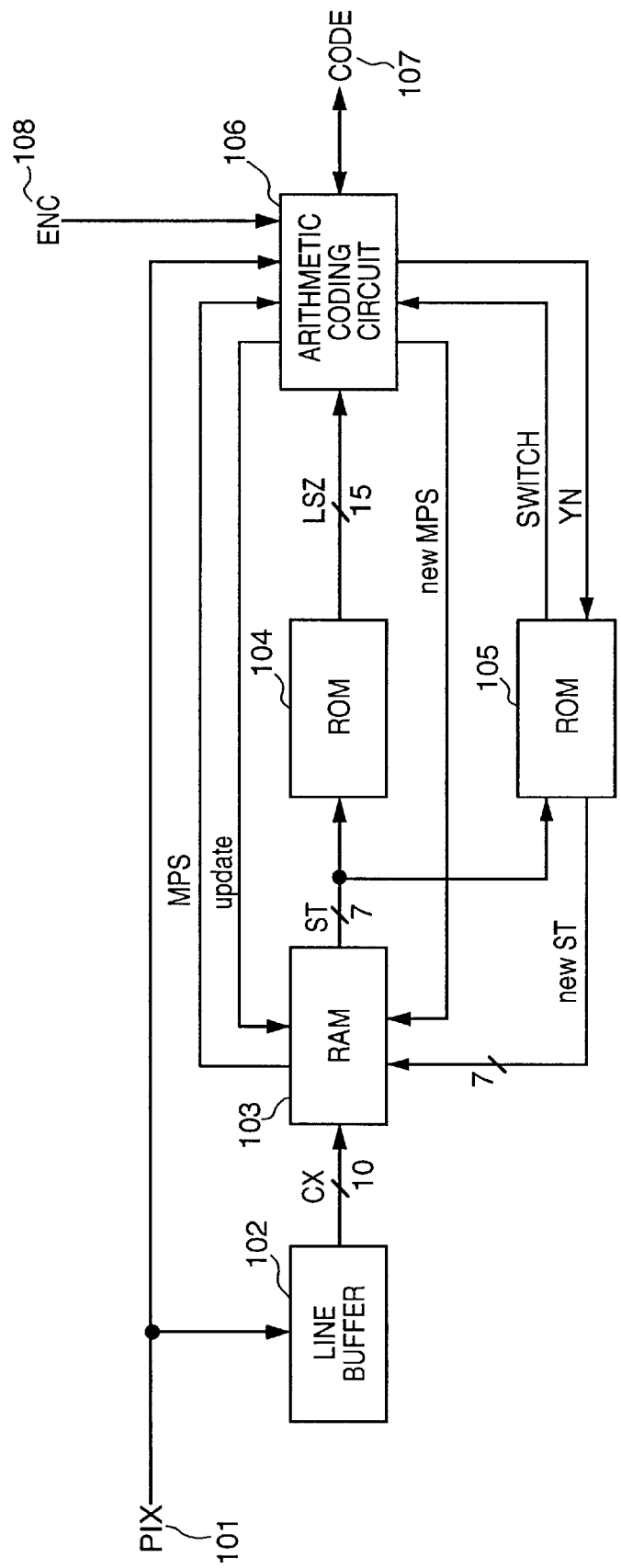
FIG. 3 is a block diagram of a compression/expansion circuit of the embodiment.

FIG. 3 shows the internal arrangement of the compression/expansion circuit 201, and this will be described next. The compression/expansion circuit 202 has the same arrangement as that of the compression/expansion circuit 201. As a compression/expansion algorithm of this embodiment, MH coding/decoding may be used. In this case, however, JBIG as an international standard will be employed. JBIG coding is hierarchical coding, and a conversion algorithm for the lowest resolution is used in this embodiment. Therefore, hierarchically coded data is not generated.

Referring to FIG. 3, PIX 101 is image data and represents an input signal. In a coding mode, one data corresponds to one pixel. Reference numeral 102 denotes a line buffer for storing a signal CX (context) near a pixel of interest, i.e., a 10-bit signal consisting of 10 pixels which have already been observed near the pixel of interest.

The signal CX is a signal of 10 pixels (10 bits) in the line buffer 102 and supplied as an address of a RAM 103. A signal MPS (expected value of the pixel of interest) and a signal ST (state value) corresponding to the signal CX are output from the RAM 103. The signal ST is input to ROMs 104 and 105. A value LSZ (15 bits) corresponding to the value of the signal ST is output from the ROM 104. The value LSZ corresponds to the probability that MPS falls short of expectation about the pixel of interest. The ROM 104 stores in advance values LSZ corresponding to all values of ST. The ROM 105 stores information of transition from a given state and information (SWITCH) defining whether the expected value MPS is to be inverted in the next occurrence of the same context if the value MPS falls short of expectation. There are two transition states depending on whether the value meets the expectation (i.e., the value of a signal YN). One state (new ST) is selected in accordance with the value of the signal YN and input to the RAM 103. The new ST and new MPS (to be described later) are written at an address of the RAM 103 corresponding to the context only when an arithmetic coding circuit 106 enables an update signal.

The arithmetic coding circuit 106 recursively divides the occurrence probability range of PIX using the value LSZ. In a coding mode, the arithmetic coding circuit 106 outputs the coordinates of the divided range as CODE. In a decoding mode as well, the arithmetic coding circuit 106 recursively divides the occurrence probability range of PIX using the value LSZ and compares given coordinates (CODE) with the division position given by LSZ, thereby determining whether PIX equals MPS. The mode of the arithmetic coding circuit 106, i.e., the coding or decoding mode is designated by a signal ENC 108. This signal ENC corresponds to the signal set in the register 205 by the CPU 12, as described above.

Figure 4:
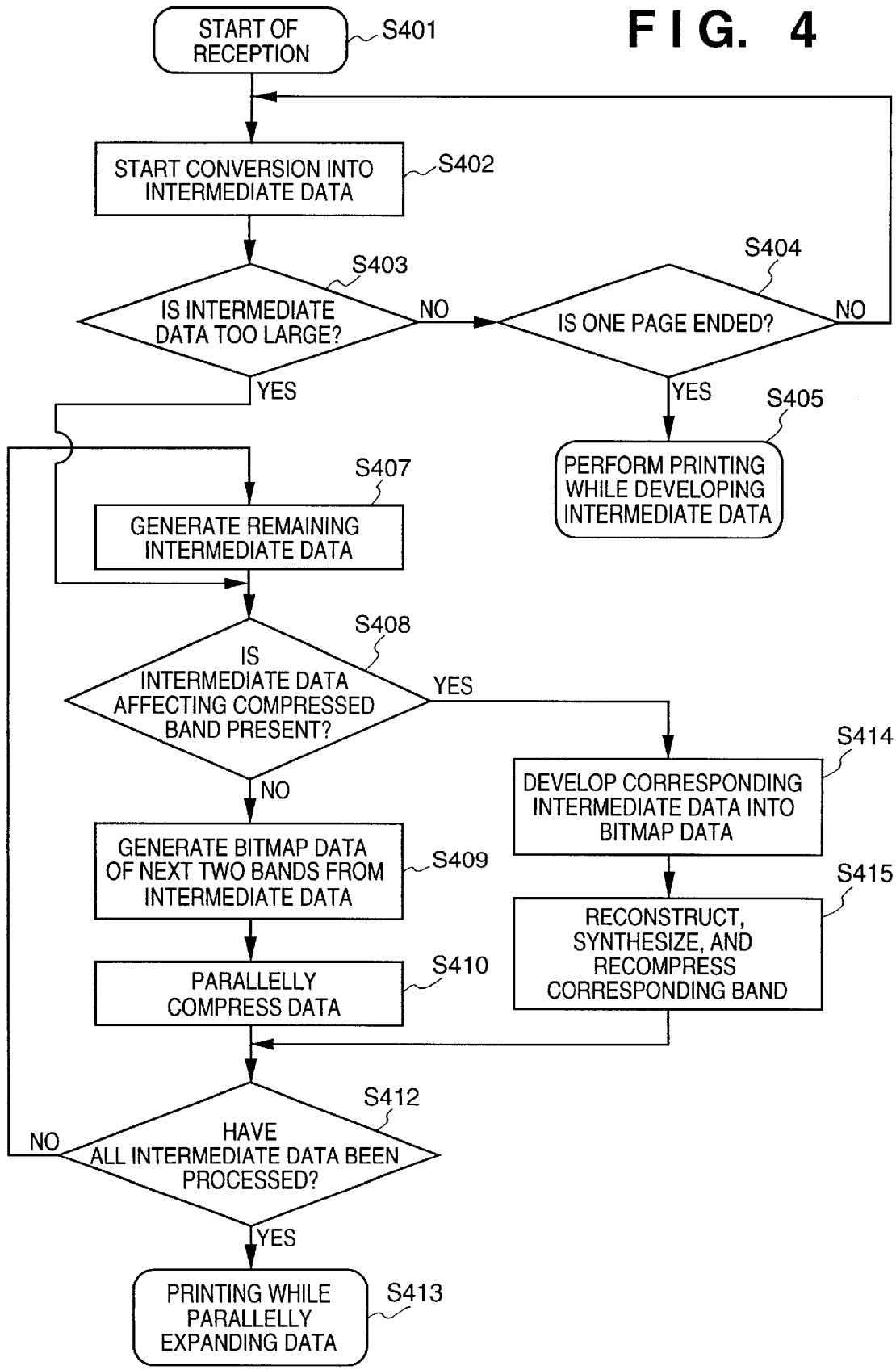
FIG. 4 is a flow chart showing a printing procedure of the embodiment.

FIG. 4 is a flow chart for explaining the procedure of printing of this embodiment.

The CPU 12 starts to receive data transmitted from the host computer 3000 (step S401). This reception processing is an interruption routine generated when the input unit 18 has received data. In the interruption routine, simple processing of storing the data latched to the input unit 18 in the reception buffer of the RAM 19 is performed, and a detailed description thereof will be omitted.

The received data is temporarily stored in the reception buffer of the RAM 19. The CPU 12 decodes the received data in the RAM 19 and starts to convert the data into intermediate data in units of bands. The resultant intermediate data is stored in the intermediate code buffer 502 of the RAM 19 (step S402).

It is checked whether the total amount of intermediate data exceeds a predetermined reference value or whether the intermediate data of an arbitrary band is too complex to require a long time in subsequent development (step S403). It is also checked whether the received data of one page has been completely converted into intermediate data (step S404).

Since the time required for bitmap development is substantially proportional to the total amount of intermediate data, both of which are checked in step S403, only one of them may be determined. Alternatively, the times required for bitmap development of individual intermediate data may be stored in a table or the like, and the total of these times may be used for the above determination.

In any case, if generation of intermediate data of one page is complete when the total amount of intermediate data is equal to or smaller than the reference amount, and the time required for bitmap development is relevant to the printing speed of the printing unit 17, the flow advances to step S405 to develop bitmap image in units of bands in accordance with the generated intermediate data and perform printing (normally, this process is performed).

In step S405, the CPU 12 sends a printing start instruction to the printing unit 17, sequentially converts the intermediate data into bitmap data in the band buffers 503 and 504 starting from the first band of the page, and transfers the bitmap data to the printing unit interface 16. In the printing unit 17, sheet conveyance and the operations of the electrostatic drum 1506 and the rotary polygon mirror 1505 start. The bitmap data is output to the laser driver 1502 as a video signal via the printing unit interface 16 in synchronism with the scanning operation of the rotary polygon mirror 1505. The printing unit interface 16 incorporates, e.g., two line memories. One functions to write bitmap data, and the other functions to read bitmap data to be output to the printing unit 17. These line memories are alternately switched in units of lines.

If it is determined that the total amount of intermediate data exceeds the reference amount, or the time required for bitmap development is likely to be inappropriate to the printing speed of the printing unit 17, the flow advances to step S408. The subsequent processing is performed to process image information of one page as compressed band data.

When the flow advances to step S408 for the first time, no compressed bands of the bitmap image are present, and the flow advances to step S409.

Bitmap data of the first two bands are generated in the band buffers 503 and 504 on the basis of the intermediate data of the first two bands.

The flow advances to step S410. Information for setting the compression/expansion circuits 201 and 202 in the coding mode is set in the register 205, and simultaneously, the switch 206 is connected to the terminal B (bus 15). The DMAC 207 is caused to transfer the bitmap data of the respective bands.

The compression/expansion circuits 201 and 202 code the input bitmap images, so the generated coded data can be stored in the compressed data storage area of the RAM 19. At this time, the CPU 12 updates the table 501 in the work area.

When bitmap development of the two bands is complete, the flow advances to step S412, and then to step S407 to process the next intermediate data. In step S407, the intermediate data which has already been developed into bitmap data in the above manner is deleted, and intermediate data of the remaining bands of the received data are generated. The flow advances to step S408 to repeat the above processing.

Generally, the print data is transferred from the host computer from the upper side to the lower side of the recording paper sheet. However, this process changes depending on the application. In step S408, it is determined whether intermediate data which should be developed is present in a band which has already been developed into bitmap data.

If YES in step S408, the band (or a plurality of bands) which has already been compressed must be expanded, and a bitmap image obtained upon expansion must be compressed again.

In this embodiment, in step S414, a bitmap image corresponding to the unprocessed intermediate data is developed in the band buffer 503 of the RAM 19. The flow advances to step S415 to reconstruct (expand), synthesize, and recompress (code) the band of interest. More specifically, the bitmap data developed in step S414 is transferred to the FIFO memory 203, and a signal is set in the register 205 such that the compression/expansion circuit 201 is set in the decoding mode, and the compression/expansion circuit 202 is set in the coding mode. Simultaneously, the switch 206 is set to select the logical operation block 204.

The newly developed bitmap data (bitmap data corresponding to the intermediate data which has been generated later) and the data which has already been compressed are synthesized by the logical operation block 204. The synthesized bitmap image data is recompressed by the compression/expansion circuit 202 and stored in the compressed data storage area 505 of the RAM 19 again.

When compression of all bands is complete, the respective compressed bands are expanded using one or both of the compression/expansion circuits 201 and 202 and printed (step S413).

With this processing, bitmap images of two bands can be compressed using the two compression/expansion circuits 201 and 202. If bitmap data which must be synthesized with a compressed band is present, the compression/expansion circuits 201 and 202 are connected in series, thereby efficiently synthesizing and recompressing the image data.

In this embodiment, a laser beam printer has been exemplified. However, as is apparent from the above description, this embodiment can be applied not only to the laser beam printer but also an LED printer or the like. Although another scheme such as an ink-jet printer can also be used, this embodiment is particularly effective for, e.g., a page printer which performs printing at a predetermined high speed once printing starts. In this sense, this embodiment is preferably applied to a page printer.

In this embodiment, JBIG has been exemplified as a compression/expansion circuit. However, the present invention is not limited to this, and any scheme may be used.

As has been described above, according to the present invention, image data can be generated at a high speed on the basis of input data while effectively utilizing limited resources.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which generates an image in units of bands on the basis of input data and outputs the image, comprising:

at least two compression/expansion means for compressing image data or expanding compressed data;

designation means for designating a compression mode or an expansion mode for each of said compression/expansion means;

setting means for dynamically connecting said compression/expansion means in parallel or in series;

logical operation means, substantially arranged at an intermediate position between said compression/expansion means connected in series by said setting means, for logically synthesizing data from an upstream compression/expansion means with desired data and supplying the synthesized data to a downstream compression/expansion means; and control means for controlling said designation means, said setting means, and said logical operation means such that when the image data is to be simply compressed/ expanded, said setting means connects said compression/expansion means in parallel, and said compression/expansion means parallelly compress/ expand the image data, and when image data which has temporarily been compressed is to be edited, said setting means connects said compression/expansion means in series, said upstream compression/expansion means is set in an expansion mode and said downstream compression/expansion means is set in a compression mode, and said logical operation means logically synthesizes the image data to generate compressed image data.

2. The apparatus according to claim 1, further comprising output means for expanding the compressed image data generated by said control means by using said compression/ expansion means, and outputting the image data.

3. The apparatus according to claim 2, wherein said output means outputs the image data to printing means for printing the image data in units of bands.

4. The apparatus according to claim 1, further comprising printing means.

5. The apparatus according to claim 4, wherein said printing means prints the image data using electrophotography.

6. An image processing apparatus comprising:
conversion means for converting data received from an external device into intermediate data;
image generation means for generating image data on the basis of the intermediate data obtained by said conversion means in units of bands;
printing means for printing an image in accordance with the image data generated in units of bands;
at least two compression/expansion means for compressing the image data or expanding compressed image data;
designation means for designating a compression mode or an expansion mode for each of said compression/ expansion means;
setting means for dynamically connecting said compression/expansion means in parallel or in series;
logical operation means, substantially arranged at an intermediate position between said compression/ expansion means connected in series by said setting means, for logically synthesizing image data from an upstream compression/expansion means with desired data and supplying the synthesized data to a downstream compression/expansion means;
control means for controlling said designation means, said setting means, and said logical operation means such that when the image data is to be simply compressed/ expanded, said setting means connects said compression/expansion means in parallel, and said compression/expansion means parallelly compress/ expand the image data, and when image data which has temporarily been compressed is to be edited, said setting means connects said compression/expansion means in series, said upstream compression/expansion means is set in an expansion mode and said downstream compression/expansion means is set in a compression mode, and said logical operation means logically synthesizes the image data to generate compressed image data; and
output means for expanding the compressed image data generated under the control of said control means and outputting the image data to said printing means.

7. A method of controlling an image processing apparatus comprising:

conversion means for converting data received from an external device into intermediate data;
image generation means for generating image data on the basis of the intermediate data obtained by said conversion means in units of bands;
printing means for printing an image in accordance with the image data generated in units of bands;
at least two compression/expansion means for compressing the image data or expanding compressed image data;
designation means for designating a compression mode or an expansion mode for each of said compression/ expansion means;
setting means for dynamically connecting said compression/expansion means in parallel or in series; and
logical operation means, substantially arranged at an intermediate position between said compression/ expansion means connected in series by said setting means, for logically synthesizing image data from an upstream compression/expansion means with desired data and supplying the synthesized data to a downstream compression/expansion means, comprising the steps of:
controlling said designation means, said setting means, and said logical operation means such that when the image data is to be simply compressed/expanded, said setting means connects said compression/expansion means in parallel, and said compression/expansion means parallelly compress/expand the image data, and when image data which has temporarily been compressed is to be edited, said setting means connects said compression/expansion means in series, said upstream compression/expansion means is in an expansion mode and said downstream compression/expansion means is set in a compression mode, and said logical operation means logically synthesizes the image data to generate compressed image data; and
expanding the generated compressed image data and outputting the image data to said printing means.

8. An image processing apparatus which receives print data from an information processing apparatus, forms an image on a predetermined recording medium, and outputs the image, comprising:
storage means for converting a page description language command of one page contained in the received print data into intermediate code data appropriate to image development and storing the resultant intermediate code data in predetermined memory means;
determination means for determining whether an amount of the stored intermediate code data is not less than a predetermined amount while said storage means is storing the intermediate code data;
development means for, when said determination means determines that the amount of intermediate code data is not less than the predetermined amount, developing the image data in units of bands in accordance with the intermediate code data stored in said memory means;
first and second compression/expansion means for compressing/expanding the image data;
first control means for connecting said first and second compression/expansion means in parallel, causing said first and second compression/expansion means to parallelly compress images of two bands, which are developed by said development means, and storing the image data in said memory means; and second control means for, when unprocessed intermediate code data corresponding to a compressed band is present, connecting said first and second compression/expansion means in series, making setting such that said first compression/expansion means performs expansion, and said second compression/expansion means performs compression, synthesizing image data obtained upon expansion by said first compression/expansion means with an image based on the unprocessed intermediate code data, causing said second compression/expansion means to compress the synthesis result, and storing the compressed image data in said memory means.

9. A method of controlling an image processing apparatus which receives print data from an information processing apparatus, forms an image on a predetermined recording medium, and outputs the image, comprising:

the storage step of converting a page description language command of one page contained in the received print data into intermediate code data appropriate to image development and storing the resultant intermediate code data in predetermined memory means;

the determination step of determining whether an amount of the stored intermediate code data is not less than a predetermined amount while the intermediate code data is being stored in the storage step;

the development step of, when it is determined in the determination step that the amount of intermediate code data is not less than the predetermined amount, developing the image data in units of bands in accordance with the intermediate code data stored in said memory means;

the first control step of connecting predetermined first and second compression/expansion circuits in parallel, causing said first and second compression/expansion circuits to parallelly compress images of two bands, which are developed in the development step, and storing the image data in said memory means; and the second control step of, when unprocessed intermediate code data corresponding to a compressed band is present, connecting said first and second compression/expansion circuits in series, making setting such that said first compression/expansion circuit performs expansion, and said second compression/expansion circuit performs compression, synthesizing image data obtained upon expansion by said first compression/expansion circuit with an image based on the unprocessed intermediate code data, causing said second compression/expansion circuit to compress the synthesis result, and storing the compressed image data in said memory means.

10. An image processing apparatus, comprising:

first and second compression/expansion means for compressing image data or expanding compressed image data;

first control means for setting said first and second compression/expansion means in parallel and designating both of said first and second compression/expansion means in a compression mode so that said first and second compression/expansion means compresses image data and stores the compressed image data in predetermined memory means in parallel; and second control means for setting said first and second compression/expansion means in series, designating said first compression/expansion means in an expansion mode while designating said second compression/expansion means in a compression mode so that said first compression/expansion means expands compressed image data stored in the predetermined memory means and said second compression/expansion means compresses the image data expanded by said first compression/expansion means.

11. An image processing method comprising:

first and second compression/expansion steps of compressing image data or expanding compressed image data;

a first control step of setting said first and second compression/expansion means in parallel and designating both of said first and second compression/expansion means in a compression mode so that image data is compressed at said first and second compression/expansion steps and the compressed image data is stored in predetermined memory means in parallel;

second control step of setting said first and second compression/expansion steps in series, designating the processing of said first compression/expansion step in an expansion mode while designating the processing of said second compression/expansion means in a compression mode so that compressed image data stored in said predetermined memory means is expanded at said first compression/expansion step and the image data expanded at said first compression/expansion step is compressed at said second compression/expansion step.

12. An image processing apparatus, comprising:

first and second compression/expansion units adapted for compressing image data or expanding compressed image data;

first control unit adapted for setting said first and second compression/expansion units in parallel and designating both of said first and second compression/expansion units in a compression mode so that said first and second compression/expansion units compresses image data and stores the compressed image data in a predetermined memory in parallel; and second control unit adapted for setting said first and second compression/expansion units in series, designating said first compression/expansion unit in an expansion mode while designating said second compression/expansion unit in a compression mode so that said first compression/expansion unit expands compressed image data stored in the predetermined memory and said second compression/expansion unit compresses the image data expanded by said first compression/expansion unit.

* * * * *

UNITED STATES PATENT AND TRADEMARK OFFICE
CERTIFICATE OF CORRECTION

| | |
|---|---|
| PATENT NO. | : 6,246,795 B1 |
| DATED | : June 12, 2001 |
| INVENTOR(S) | : Minoru Kanbegawa |

It is certified that error appears in the above-identified patent and that said Letters Patent is hereby corrected as shown below:

<u>Column 12,</u>
Line 25, "parallel;" should read -- parallel; and --.

Signed and Sealed this

Twelfth Day of March, 2002

*Attest:*

*Attesting Officer*

JAMES E. ROGAN
*Director of the United States Patent and Trademark Office*